April 29, 1924.
S. A. HARRIS
LEAF SPRING LUBRICATING MEANS
Filed April 3, 1923
1,492,031
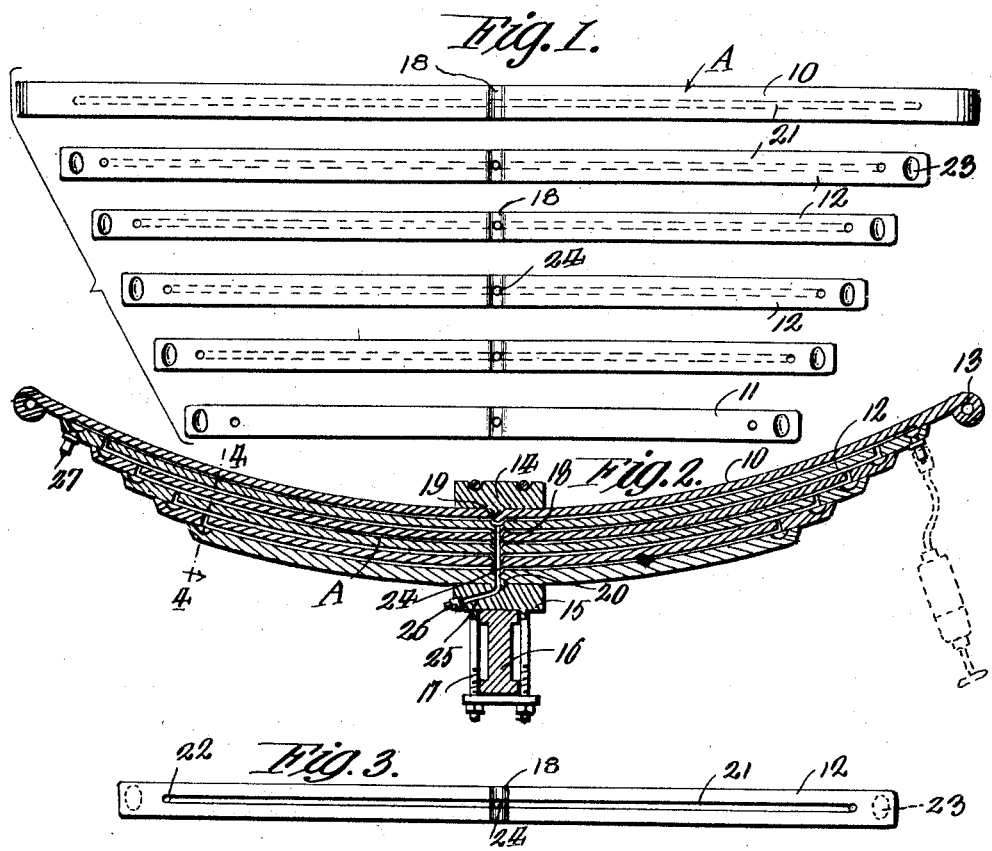
Inventor
SPENCER A. HARRIS Patented Apr. 29, 1924.

1,492,031

UNITED STATES PATENT OFFICE.

SPENCER A. HARRIS, OF WASHINGTON, DISTRICT OF COLUMBIA.

LEAF-SPRING-LUBRICATING MEANS.

Application filed April 3, 1923. Serial No. 629,643.

*To all whom it may concern:*

Be it known that I, SPENCER A. HARRIS, a citizen of the United States, residing at Washington, in the District of Columbia, have invented certain new and useful Improvements in a Leaf-Spring-Lubricating Means, of which the following is a specification.

This invention relates to vehicle springs and the primary object of the present invention is to provide a novel leaf spring for motor vehicles in which the various sections or leaves thereof are so constructed that the spring will be effectively lubricated at all parts thereof.

Another object of the invention is to provide a vehicle spring embodying means for permitting a grease gun to be attached thereto for forcing the grease or lubricating oil between the leaves of the spring, the leaves being connected together in a novel manner for permitting the grease or lubricating oil to flow from one spring to another.

A further object of the invention is to provide a novel leaf spring which will permit flushing out thereof by a cleaning agent such as kerosene, turpentine or the like, so that all foreign matter such as grit, sand, dirt and the like will be carried out and away from between the various leaves or sections of the spring.

A further object of the invention is to provide an improved vehicle spring having the various sections thereof connected by longitudinally extending channels, the channels having communication with one another by means of vertically disposed ports or ways, each leaf having a pocket or reservoir below said ports or ways.

A still further object of the invention is to provide means whereby the various sections of the spring will be held against longitudinal movement in relation to one another and thus effectively prevent the screeching and other noise incident to this movement.

A still further object of the invention is to provide an improved vehicle leaf spring of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a diagrammatic view illustrating the various leaves or sections of the improved spring.

Figure 2 is a longitudinal section through the improved spring showing the same connected with a vehicle axle, the axle and connecting means being shown in transverse section.

Figure 3 is a bottom plan view of one of the leaves of the spring.

Figure 4 is a transverse section through the improved spring taken on the line 4—4 of Figure 2.

Figure 5 is an enlarged fragmentary longitudinal section through the central portion of the spring showing the means for permitting the interconnection of the various leaves or sections of the spring, whereby longitudinal movement of the leaves or sections in relation to one another will be effectively prevented.

Referring to the drawings in detail, wherein similar reference characters designate corresponding parts throughout the several views, the letter A generally indicates the improved spring constructed in accordance with this invention, which includes the upper and lower leaves 10 and 11 and the intermediate leaves 12. The general shape and construction of the spring is the same as the ordinary springs and the leaves successively decrease in length toward the lowermost section or leaf 11. The uppermost leaf 10 has its terminals terminating in eyes 13 in the ordinary way. The spring A is fitted between upper and lower blocks 14 and 15 which rest upon the upper surface of the axle indicated by the reference character 16. The blocks and consequently the spring are clamped to the axle by means of suitable U-shaped bolts or clevises 17.

The various sections or leaves of the spring A at the transverse center thereof are provided with struckout transversely extending ribs 18 which are adapted to fit one within the other as clearly shown in Figures 2 and 5 of the drawings and thus longitudinal movement of the various leaves or sections 12 of the springs in relation to each other is prevented. The upper block 14 is provided with a transverse rib 19 for engaging in the struckout portion in the uppermost leaf 10, while the lower block 15 is provided with a groove 20 for receiving the struckout rib formed in the lowermost leaf 11. The blocks 14 and 15 form an effective means for holding the various leaves in place should the spring break at the transverse center thereof, as the blocks prevent swinging movement of the leaves which prevent the leaves from working loose. The under surface of the uppermost leaf 10 and all of the intermediate leaves 12 are provided with longitudinally extending lubricating feed grooves 21. As clearly shown in Figure 2 of the drawings these grooves are disposed at the longitudinal axis of the leaves and terminate short of the terminals of the leaves and have communicating therewith vertically extending passageways or ports 22. The upper surfaces of all of the intermediate leaves 12 and the lowermost leaf 11 are provided with pockets or lubricating reservoirs 23 which terminate directly below the terminals of the grooves formed in the next adjacent leaf as clearly shown in Figure 2 of the drawings, and thus the ports 22 communicate with a pocket or reservoir in the leaf or spring section immediately below the same.

It is to be also noted that the intermediate leaves 12 and the lower leaf 11 are provided at their transverse centers with communicating ways 24 and that the lower block 15 has a passage 25 which is adapted to register therewith, and this passage 25 is adapted to be normally closed by a plug, nipple or the like 26.

The terminals of the section 12 of the spring can be provided with lubricating filling nipples 27 which are adapted to communicate with the reservoirs 23 formed in the section. As clearly shown in Figure 2 of the drawings these nipples form means for permitting the packing of the spring with grease, by a suitable grease gun or the like.

When it is desired to pack the spring with grease, the grease gun can be connected with one of the nipples 27 and the lubricant squirted into the spring. The lubricant will of course flow down through the grooves of one spring and into the reservoir and thus fill up all of the grooves and all of the reservoirs. The reservoirs or pockets will of course maintain a sufficient amount of lubricant between the leaves of the spring to permit the automatic lubrication of the spring for a considerable length of time. If any grit or the like should be caught between the leaves of the spring, the same will work into the grooves and follow the same to the reservoirs or pockets.

When it is desired to clean the spring, it is merely necessary to connect a suitable grease gun or the like to one of the nipples 27, which has been previously filled with gasoline, kerosene or the like and remove the plug or nipple 26. This forcing of the fluid will completely flush out the spring and carry all foreign matter therefrom.

It is to be understood that when the spring is in an inverted position such as in a Ford car construction, that the grooves will be formed in the lower faces of leaves of the spring and the reservoirs in the upper faces of the leaves.

From the foregoing description it can be seen that I have provided an exceptionally simple and durable leaf spring which will effectively accomplish the purpose intended.

Changes in details may be made without departing from the spirit or the scope of this invention.

What I claim as new is:

1. A vehicle spring comprising a plurality of independent leaves, longitudinally extending channelways formed in certain of the springs and ways extending through the leaves and the terminals of the channelways for connecting the channelways of all of the leaves together, pockets formed in the upper faces of the leaves directly below said last mentioned passageways and means for connecting the channelways together at the central portion of the leaves.

2. A vehicle spring comprising a plurality of independent leaves having longitudinally extending channelways therein, means for connecting the terminals of the channelways together, means for connecting the channelways together at the central portion of the leaves, filling nipples communicating with the terminals of certain of the channelways, and a passage way communicating with said channels at the central portion thereof constituting an outlet way, as and for the purpose specified.

3. In a vehicle spring embodying a plurality of leaves having longitudinally extending channelways formed therein, the channelways being connected one with the other at the central portion of the leaves, upper and lower blocks for receiving the leaves, means for clamping the blocks together, the lowermost block having a passageway formed therein for communicating with the means for connecting the channels together, and a removable plug threaded in said last mentioned passageway.

4. In a vehicle spring embodying a plurality of leaves having longitudinally extending channelways formed therein, the channelways being connected one with the other at the central portion of the leaves, and adjacent to the terminals of the leaves, means for introducing a lubricant into one of said longitudinally extending channelways adjacent to the terminals thereof, the means connecting the channelways at the central portion of the leaves extending entirely through the lowermost leaf and constituting a discharge opening during the flushing of the spring for cleaning purposes, and means for closing said means for connecting the channelways together at the central portion of the leaves.

In testimony whereof I affix my signature in presence of two witnesses.

SPENCER A. HARRIS.

Witnesses:
HARMON BURNS,
S. W. COURTRITE.